US012591106B2

(12) United States Patent
Jang

(10) Patent No.: US 12,591,106 B2
(45) Date of Patent: Mar. 31, 2026

(54) CAMERA MODULE

(71) Applicant: LG INNOTEK CO., LTD., Seoul (KR)

(72) Inventor: Young Bae Jang, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 968 days.

(21) Appl. No.: 16/965,957

(22) PCT Filed: Jan. 22, 2019

(86) PCT No.: PCT/KR2019/000912
§ 371 (c)(1),
(2) Date: Jul. 29, 2020

(87) PCT Pub. No.: WO2019/151700
PCT Pub. Date: Aug. 8, 2019

(65) Prior Publication Data

US 2021/0041658 A1 Feb. 11, 2021

(30) Foreign Application Priority Data

Jan. 30, 2018 (KR) ........................ 10-2018-0011062

(51) Int. Cl.
*G02B 7/09* (2021.01)
*G02B 13/00* (2006.01)
(Continued)

(52) U.S. Cl.
CPC ........... *G02B 7/09* (2013.01); *G02B 13/0065* (2013.01); *G02B 15/143* (2019.08); *G03B 5/00* (2013.01);
(Continued)

(58) Field of Classification Search
CPC .......... G02B 7/09; G02B 7/023; G02B 7/025; G02B 7/026; G02B 7/08; G02B 7/021;
(Continued)

(56) References Cited

U.S. PATENT DOCUMENTS 4,420,193 A 12/1983 Teramachi
5,225,941 A 7/1993 Saito et al.
(Continued)

FOREIGN PATENT DOCUMENTS

CN 1423148 A 6/2003
CN 1637892 A 7/2005
(Continued)

*Primary Examiner* — Marin Pichler
(74) *Attorney, Agent, or Firm* — Birch, Stewart, Kolasch & Birch, LLP

(57) ABSTRACT

A camera module includes a base, a plurality of guide bars coupled to the base, a first mover disposed in the base, the first mover including at least one lens disposed therein, and a second mover disposed in the base, the second mover including at least one lens disposed therein, wherein each of the first mover and the second mover includes a plurality of guide grooves formed therein to allow the guide bars to be disposed therein, and wherein each of the plurality of guide grooves includes a protruding portion formed to be in contact with a respective one of the guide bars.

20 Claims, 12 Drawing Sheets

(51) Int. Cl.
  *G02B 15/14* (2006.01)
  *G03B 5/00* (2021.01)
  *G03B 13/36* (2021.01)

(52) U.S. Cl.
  CPC ...... *G03B 13/36* (2013.01); *G03B 2205/0046* (2013.01)

(58) Field of Classification Search
  CPC . G02B 7/005; G02B 7/04; G02B 7/10; G02B 27/64; G02B 27/646; G02B 13/001; G02B 13/0055; G02B 13/0065; G02B 13/009; G03B 5/00; G03B 5/02; G03B 13/34; G03B 13/36; G03B 13/32; G03B 2205/0069; G03B 2205/0053; G03B 2205/0015; G03B 2205/0007; G03B 2205/0046; G03B 19/22; G03B 3/10; G03B 17/02; H04N 5/2328; H04N 5/2253; H04N 5/2254; H05K 1/18; H02K 41/0354; H02K 41/0356
  USPC ............... 359/822, 823, 824, 694, 696, 813; 396/89
  See application file for complete search history.

(56) References Cited

U.S. PATENT DOCUMENTS

| | | | |
|---|---|---|---|
| 5,890,391 A | 4/1999 | Okada | |
| 2007/0053672 A1 | 3/2007 | Westerweck et al. | |
| 2009/0140581 A1* | 6/2009 | Liu .................... | H02K 41/0356 310/12.16 |
| 2009/0237816 A1 | 9/2009 | Kakuta | |
| 2010/0259836 A1 | 10/2010 | Kang et al. | |

| | | | |
|---|---|---|---|
| 2013/0064535 A1* | 3/2013 | Hu ......................... | G02B 7/023 248/550 |
| 2013/0100538 A1 | 4/2013 | Kim | |
| 2013/0222929 A1 | 8/2013 | Park | |
| 2014/0022654 A1 | 1/2014 | Harada et al. | |
| 2014/0125948 A1 | 5/2014 | Feiertag et al. | |
| 2015/0110480 A1* | 4/2015 | Suzuka ................ | G02B 27/646 396/55 |
| 2015/0177479 A1 | 6/2015 | Lee et al. | |

FOREIGN PATENT DOCUMENTS

| | | |
|---|---|---|
| CN | 2901351 Y | 5/2007 |
| CN | 101324692 A | 12/2008 |
| CN | 101483376 A | 7/2009 |
| CN | 101520537 A | 9/2009 |
| CN | 102023366 A | 4/2011 |
| CN | 103293628 A | 9/2013 |
| CN | 103443684 A | 12/2013 |
| CN | 106461908 A | 2/2017 |
| EP | 1 752 806 A1 | 2/2007 |
| JP | 8-29660 A | 2/1996 |
| JP | 2004-219440 A | 8/2004 |
| JP | 2009-294454 A | 12/2009 |
| JP | 2010-262246 A | 11/2010 |
| JP | 2012-19656 A | 1/2012 |
| KR | 10-2010-0113328 A | 10/2010 |
| KR | 10-2013-0041283 A | 4/2013 |
| KR | 10-2013-0042788 A | 4/2013 |
| KR | 10-2014-0069803 A | 6/2014 |
| KR | 10-2015-0114802 A | 10/2015 |
| KR | 10-2016-0022656 A | 3/2016 |
| KR | 10-2016-0037732 A | 4/2016 |
| KR | 10-2017-0051928 A | 5/2017 |
| TW | 201333526 A | 8/2013 |
| WO | WO 2014/042440 A1 | 3/2014 |

* cited by examiner

【FIG. 1】
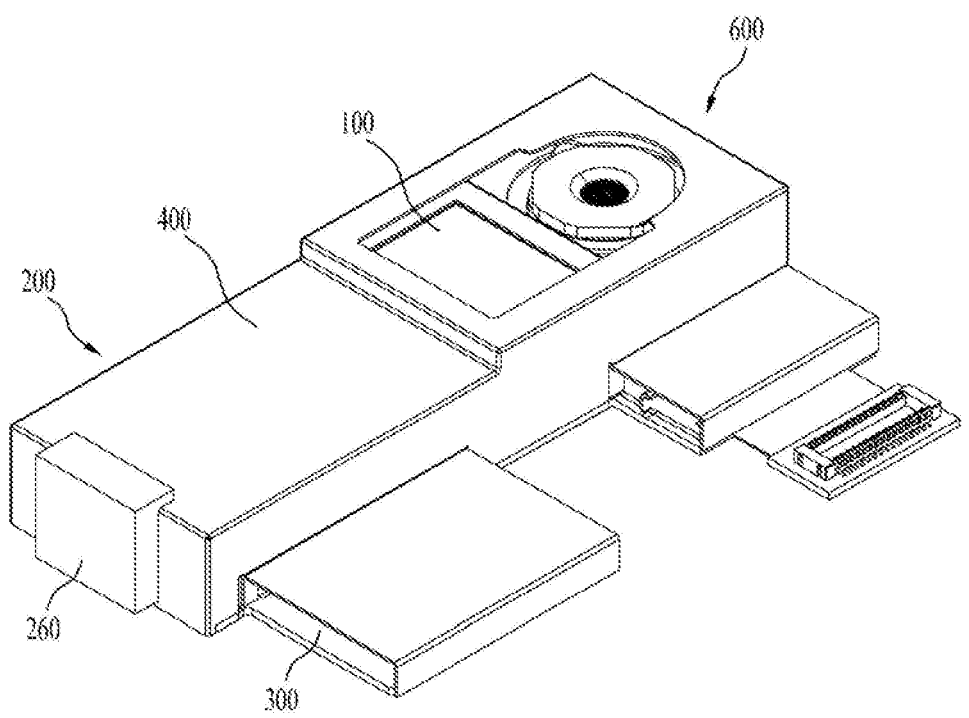

【FIG. 2】
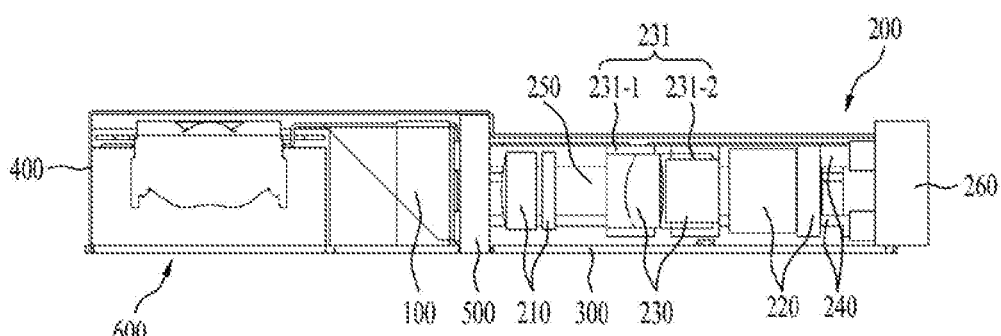

【FIG. 3】
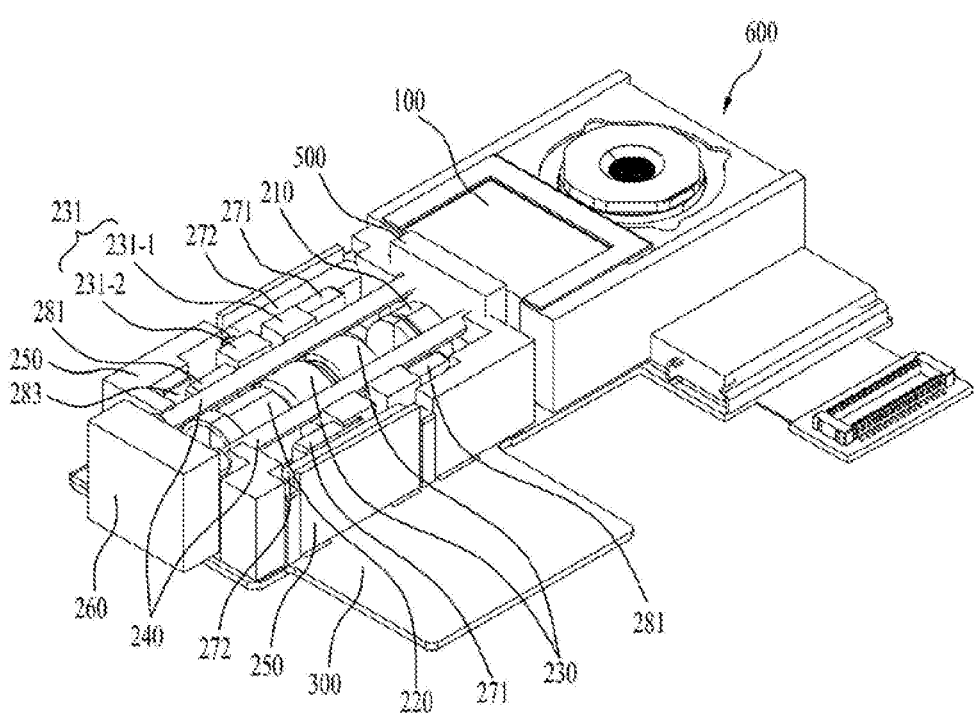

【FIG. 4】
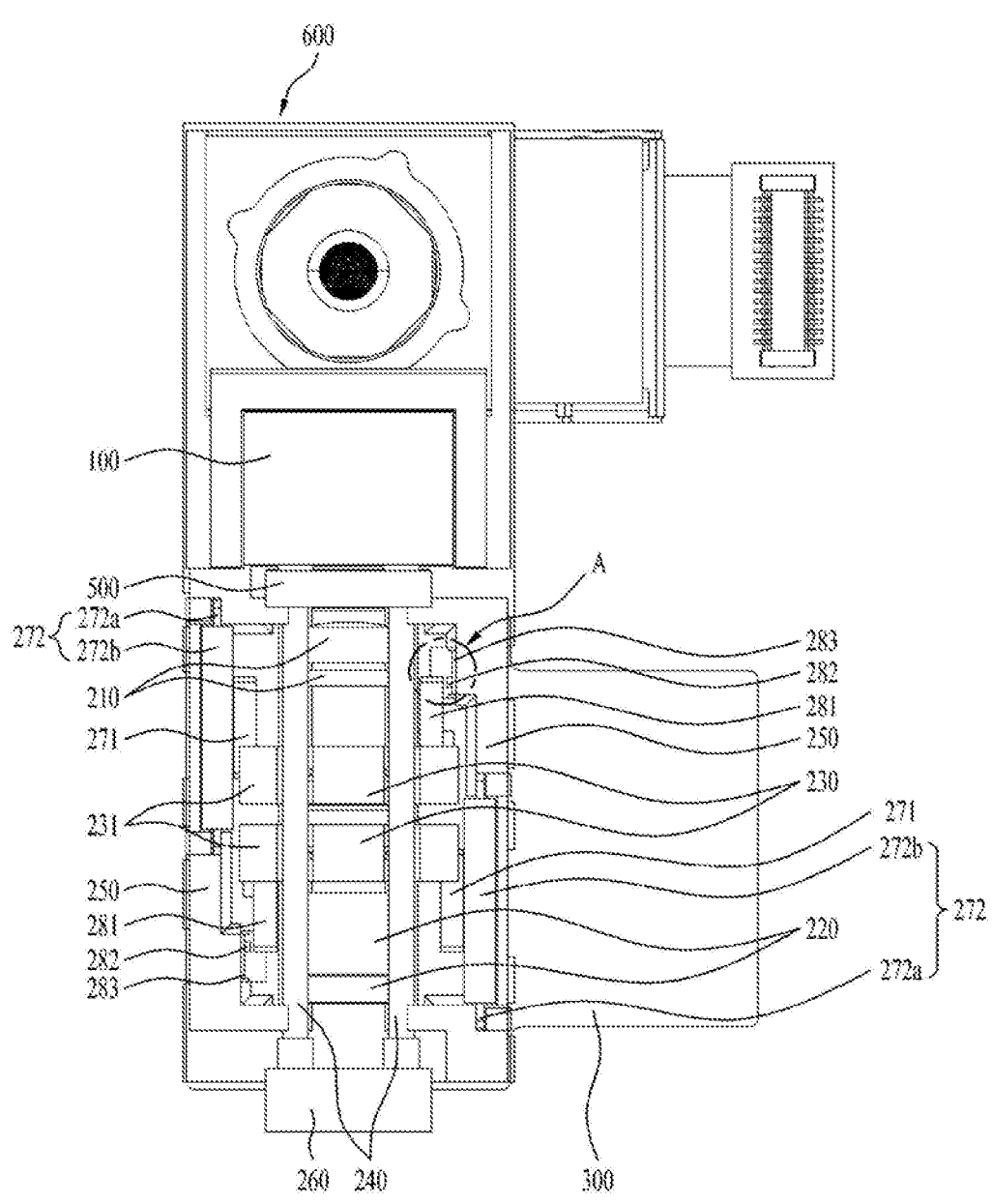

【FIG. 5】
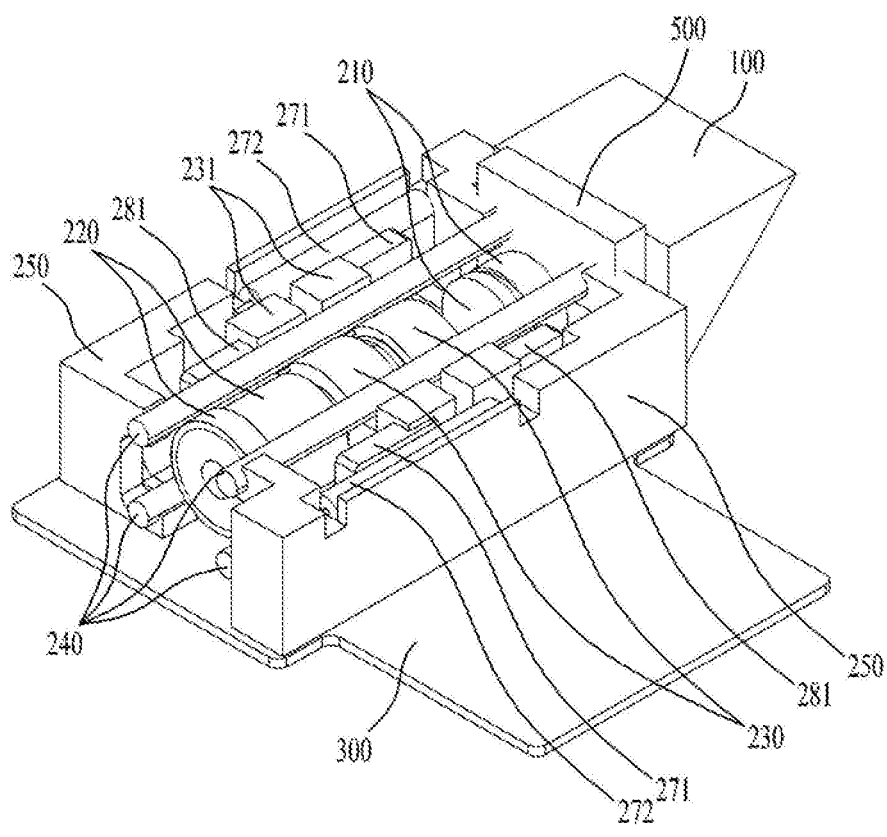

【FIG. 6】
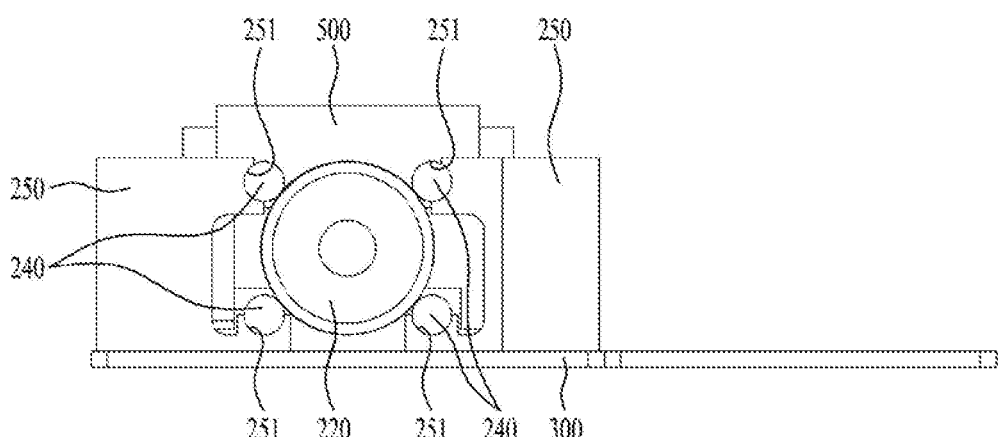

【FIG. 7】
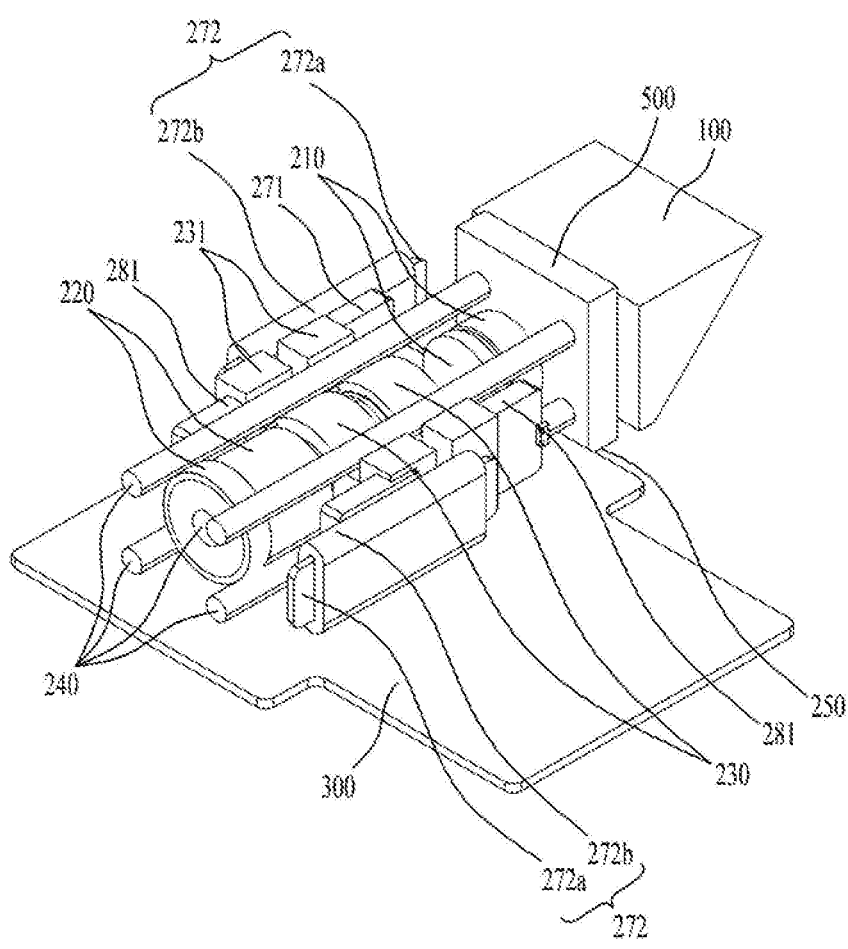

【FIG. 8】
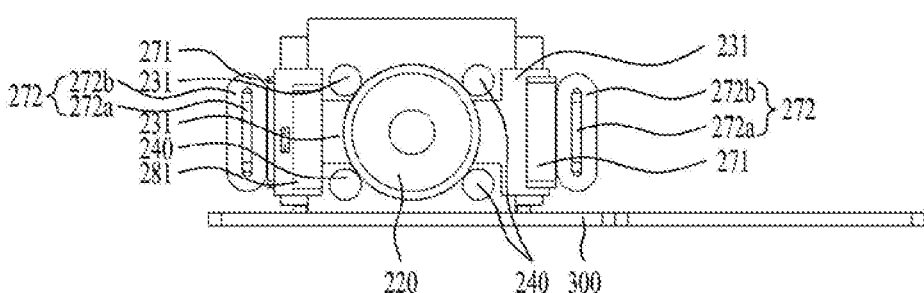

【FIG. 9】
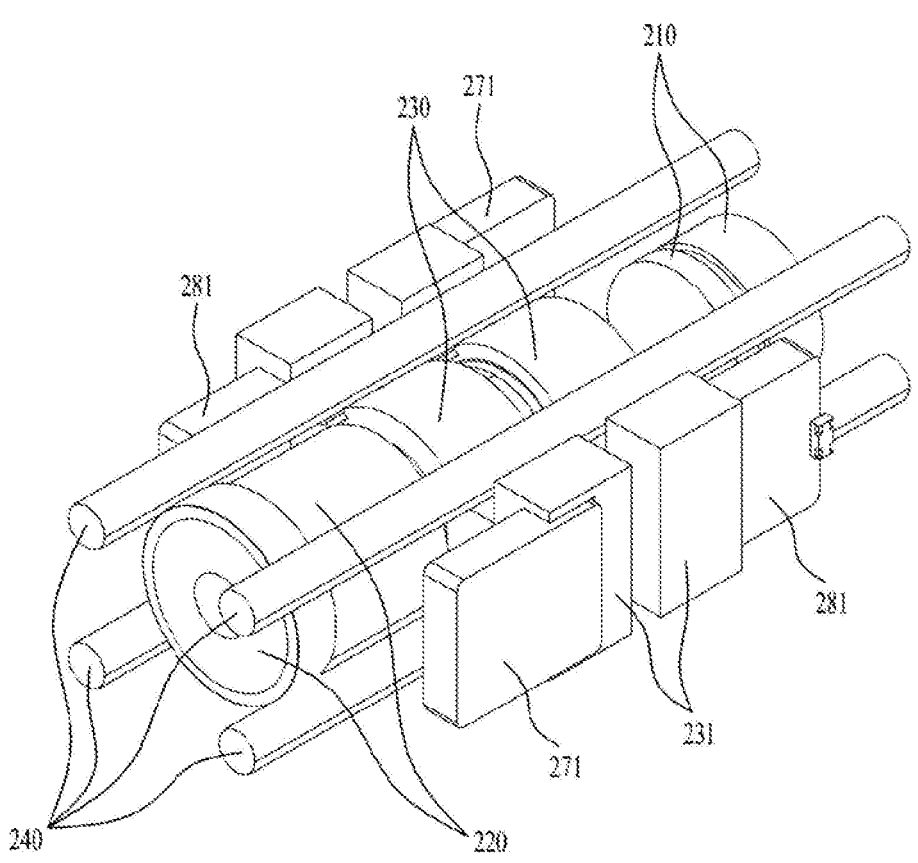

【FIG. 10】
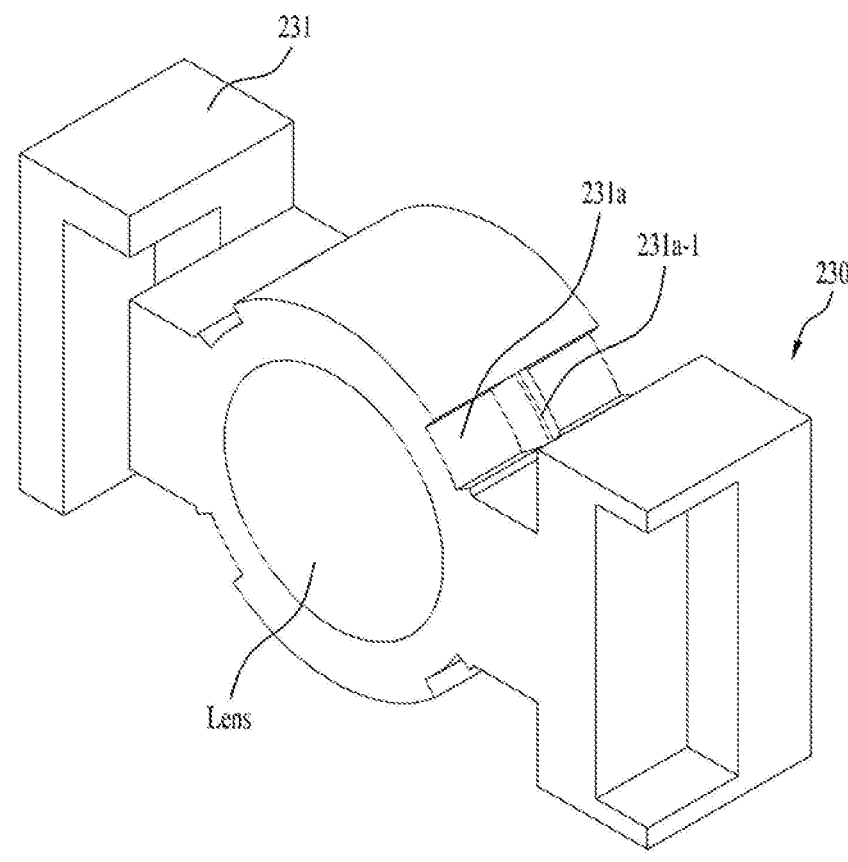

【FIG. 11】
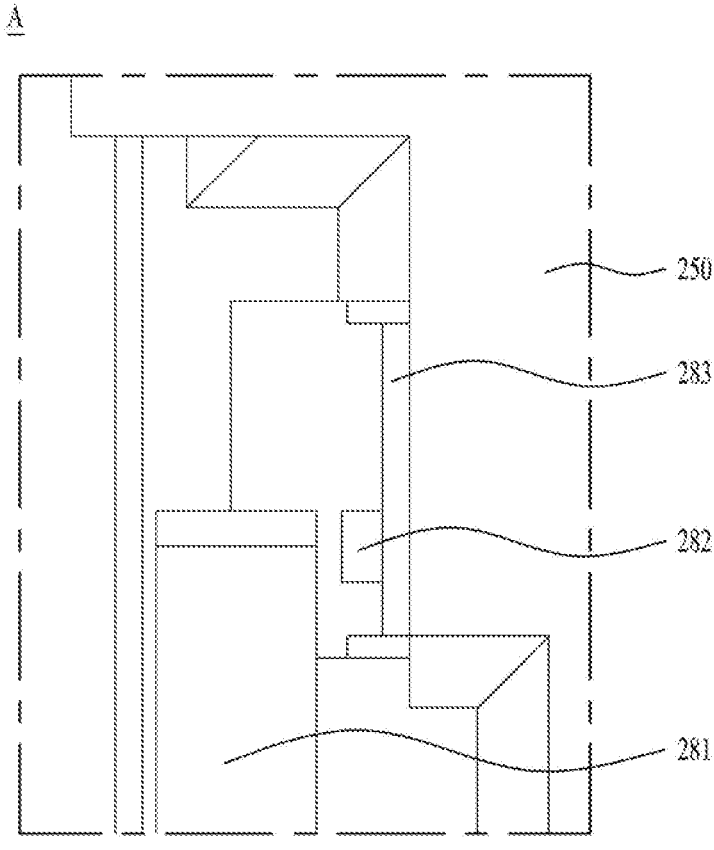

【FIG. 12】
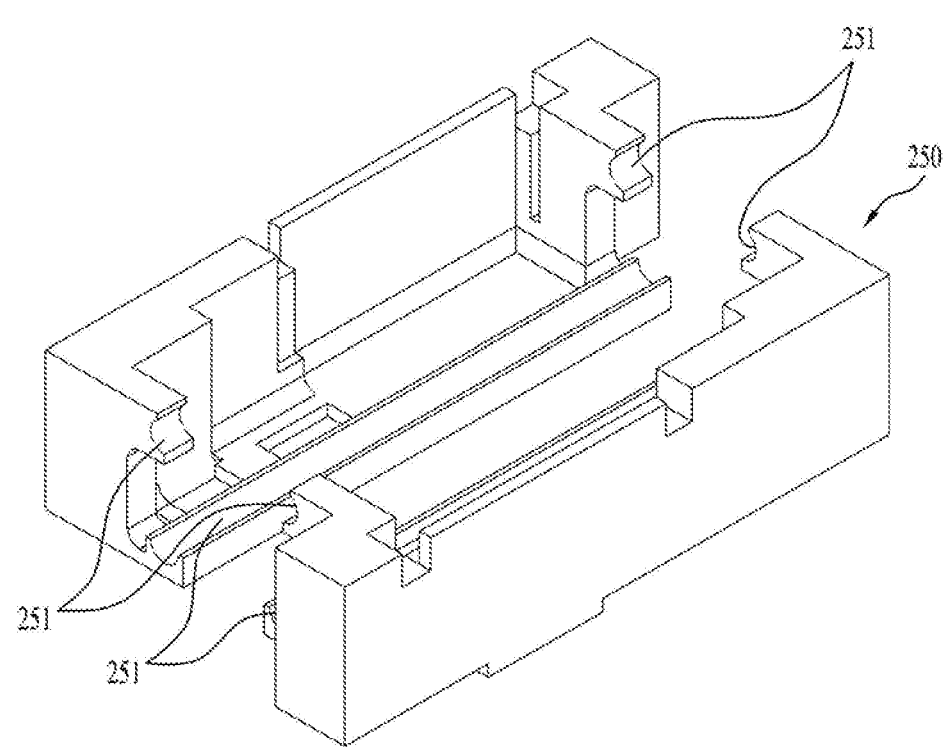

CAMERA MODULE

CROSS REFERENCE TO RELATED APPLICATIONS

This application is the National Phase of PCT International Application No. PCT/KR2019/000912, filed on Jan. 22, 2019, which claims priority under 35 U.S.C. 119(a) to Patent Application No. 10-2018-0011062, filed in the Republic of Korea on Jan. 30, 2018, all of which are hereby expressly incorporated by reference into the present application.

TECHNICAL FIELD

Embodiments relate to a camera module configured to perform auto-focusing and zoom-up functions.

BACKGROUND ART

The content described in this section merely provides background information regarding embodiments, and does not constitute the conventional art.

Mobile phones or smartphones equipped with camera modules that take an image or a video of an object and store the same have been developed. In general, a camera module may include a lens, an image sensor module, and a lens-moving device for adjusting the distance between the lens and the image sensor module.

Mobile devices, such as mobile phones, smartphones, tablet PCs, and laptops, have built-in miniature camera modules. Camera modules may perform an auto-focusing function of adjusting the distance between an image sensor and a lens to control the focal length of the lens.

Meanwhile, camera modules may also perform a zoom-up function, i.e. a function of photographing an object located a long distance away with increased magnification.

Since miniature camera modules have a limited size, there is a problem in that it is difficult to construct miniature camera modules such that they perform a zoom-up function of the type implemented in general large-scale cameras.

DISCLOSURE

Technical Problem

Embodiments relate to a camera module configured to perform auto-focusing and zoom-up functions.

The objects to be accomplished by the disclosure are not limited to the above-mentioned objects, and other objects not mentioned herein will be clearly understood by those skilled in the art from the following description.

Technical Solution

A camera module according to an embodiment may include a prism configured to change an optical path and a moving unit disposed opposite the prism. The moving unit may include a first lens group disposed adjacent to the prism, a second lens group disposed so as to be spaced apart from the first lens group in an optical-axis direction, a third lens group disposed between the first lens group and the second lens group and configured to move in the optical-axis direction, a guide bar disposed such that the longitudinal direction thereof is oriented in the optical-axis direction and configured to be in sliding contact with the third lens group to guide movement of the third lens group, and a base to which the guide bar is mounted.

The third lens group may include a mover, which is provided in a plural number and includes at least one lens.

The mover may include a first mover, disposed adjacent to the first lens group, and a second mover, disposed between the first mover and the second lens group.

The guide bar may be provided in a plural number so as to surround the first lens group, the second lens group, and the third lens group.

The mover may include a guide groove in which the guide bar is disposed so as to be in sliding contact therewith.

The guide groove may include a protruding portion formed to be in contact with the guide bar in order to reduce the contact area with the guide bar.

The camera module according to an embodiment may further include a coupling member coupled to at least one end of the guide bar to fix the position of the guide bar.

The camera module according to an embodiment may further include a driving magnet coupled to the mover and a coil part coupled to the base and disposed opposite the driving magnet.

The coil part may include a yoke mounted to the base and disposed such that the longitudinal direction thereof is oriented in the optical-axis direction and a moving coil wound on the yoke such that a part thereof is disposed opposite the driving magnet.

The camera module according to an embodiment may further include a sensing magnet coupled to the mover, a position sensor coupled to the base and disposed opposite the sensing magnet, and a second printed circuit board coupled to the base and configured to allow the position sensor to be mounted thereon.

The sensing magnet may be spaced apart from the driving magnet in the optical-axis direction and in a direction perpendicular to the optical-axis direction, and the position sensor may be spaced apart from the coil part in the optical-axis direction and in a direction perpendicular to the optical-axis direction.

The base may include a mounting groove in which the guide bar is mounted, and the mounting groove may be formed in the longitudinal direction of the guide bar.

The camera module according to an embodiment may further include a first printed circuit board coupled to the bottom surface of the base.

The camera module according to an embodiment may further include a cover member configured to accommodate the prism and the moving unit.

The camera module according to an embodiment may further include an OIS correction unit, disposed between the prism and the moving unit, and a second photographing unit, spaced apart from the prism and the moving unit.

A camera module according to an embodiment may include a base, a plurality of guide bars coupled to the base, a first mover disposed in the base and including at least one lens disposed therein, and a second mover disposed in the base and including at least one lens disposed therein. Each of the first mover and the second mover may include a plurality of guide grooves formed therein to allow the guide bars to be disposed therein, and each of the guide grooves may include a protruding portion formed to be in contact with a respective one of the guide bars.

For example, the camera module may include a prism configured to change an optical path of external light incident thereon such that the optical path is oriented in a direction perpendicular to the direction in which the lens disposed in the first mover and the lens disposed in the second mover are aligned.

For example, the guide bars may be disposed so as to surround the first mover and the second mover.

For example, the camera module may further include a coupling member coupled to at least one end of each of the guide bars to fix the positions of the guide bars.

For example, the base may include mounting grooves formed therein to allow the guide bars to be disposed therein.

For example, the camera module may further include a first driving magnet disposed at one side of the first mover, a first coil part coupled to the base and disposed opposite the first driving magnet, a sensing magnet disposed at the opposite side of the mover, and a first position sensor coupled to the base and disposed opposite the sensing magnet.

For example, the first sensing magnet may be spaced apart from the first driving magnet in a direction perpendicular to the optical-axis direction.

For example, the camera module may further include a lens disposed between the prism and the first mover or between the prism and the second mover.

For example, the camera module may further include a lens disposed between the first mover and the second mover.

Advantageous Effects

In an embodiment, a third lens group, which is disposed between a first lens group and a second lens group, is composed of two lens groups, and the moving directions and the moving distances of the respective lens groups are independently adjusted by a first mover and a second mover. Thus, a camera module according to an embodiment is capable of efficiently and accurately performing auto-focusing and zoom-up functions.

In an embodiment, since a mover is provided so as to move in an optical-axis direction through sliding contact between a guide bar and the mover, a camera module capable of efficiently performing auto-focusing and zoom-up functions with a simple structure may be realized.

In an embodiment, a third lens group and a second lens group are sequentially disposed behind a first lens group, and the moving directions and the moving distances of the second lens group and the third lens group are independently adjusted by a first mover and a second mover. Thus, a camera module according to an embodiment is capable of efficiently and accurately performing auto-focusing and zoom-up functions.

DESCRIPTION OF DRAWINGS

FIG. 1 a perspective view illustrating a camera module according to an embodiment.

FIG. 2 is a cross-sectional view of FIG. 1 when viewed from the side.

FIG. 3 is a perspective view of FIG. 1, from which a cover member is removed.

FIG. 4 is a plan view of FIG. 3.

FIG. 5 is a perspective view of FIG. 3, from which some components are removed.

FIG. 6 is a front view of FIG. 5.

FIG. 7 is a perspective view of FIG. 5, from which some components are removed.

FIG. 8 is a front view of FIG. 7.

FIG. 9 is a perspective view of FIG. 7, from which some components are removed.

FIG. 10 is a perspective view illustrating a third lens group according to an embodiment.

FIG. 11 is an enlarged view of part A in FIG. 4.

FIG. 12 is a perspective view illustrating a base according to an embodiment.

BEST MODE

Hereinafter, exemplary embodiments will be described in detail with reference to the accompanying drawings. While the disclosure is susceptible to various modifications and alternative forms, specific embodiments thereof are shown by way of example in the drawings. However, the disclosure should not be construed as being limited to the embodiments set forth herein, but on the contrary, the disclosure is to cover all modifications, equivalents, and alternatives falling within the spirit and scope of the embodiments.

It may be understood that, although the terms "first", "second", etc. may be used herein to describe various elements, these elements are not to be limited by these terms. These terms are generally only used to distinguish one element from another. In addition, terms particularly defined in consideration of the construction and operation of the embodiments are used merely to describe the embodiments, and do not define the scope of the embodiments.

In the following description of the embodiments, it will be understood that, when each element is referred to as being "on" or "under" another element, it can be directly on or under the other element, or can be indirectly formed such that one or more intervening elements are also present. In addition, when an element is referred to as being "on" or "under", "under the element" as well as "on the element" may be included based on the element.

In addition, relational terms, such as "on/upper part/above" and "under/lower part/below", are used only to distinguish between one subject or element and another subject or element, without necessarily requiring or involving any physical or logical relationship or sequence between such subjects or elements.

In the description of the embodiments, the optical-axis direction is a direction that is the same as or parallel to the direction in which a first lens group 210 to a third lens group 230 are aligned.

FIG. 1 is a perspective view illustrating a camera module according to an embodiment. FIG. 2 is a cross-sectional view of FIG. 1 when viewed from the side. FIG. 3 is a perspective view of FIG. 1, from which a cover member 400 is removed. FIG. 4 is a plan view of FIG. 3.

As illustrated in FIG. 1, a camera module may include at least one of a first photographing unit or a second photographing unit, and one thereof may be omitted. The camera module may include a prism 100, a moving unit 200, a cover member 400, and a first printed circuit board 300. In this case, a part including the prism 100 and the moving unit 200 may be the first photographing unit. The second photographing unit 600 may be disposed so as to be spaced apart from the first photographing unit including the prism 100 and the moving unit 200.

The first photographing unit 100 and 200 and the second photographing unit 600 may be independently provided to capture an image, and may be driven by one controller (not illustrated). The images captured by the first photographing unit 100 and 200 and the second photographing unit 600 may be edited by the controller to be expressed as a single image.

The image edited by the controller may become a wide-angle image or a zoomed-up image with a high resolution compared with the image captured by one of the first photographing unit 100 and 200 and the second photographing unit 600.

The camera module of the embodiment may be, for example, a miniature camera module for use in smartphones, tablet PCs, or the like. Therefore, the camera module may function as a so-called dual camera, in which the first photographing unit 100 and 200 and the second photographing unit 600 are separately provided and the images captured thereby are edited to a single image.

The second photographing unit 600 may be implemented as a general camera device. Thus, the following description will focus on the first photographing unit including the prism 100 and the moving unit 200.

The cover member 400 may cover the entirety of the camera module to accommodate the first photographing unit, which includes the prism 100 and the moving unit 200, and the components constituting the second photographing unit 600 so as to protect these components.

The cover member 400 may be bonded to a base 250, which accommodates the prism 100 and the moving unit 200, and may also be bonded to a housing, which accommodates the second photographing unit 600, thereby protecting the components of the camera module.

The prism 100 may be disposed in front of the moving unit 200 to change an optical path. Referring to FIGS. 1 and 2, external light may be incident on the prism 100 in the optical-axis direction, i.e. in a direction perpendicular to the direction in which the first lens group 210 to the third lens group 230 are aligned.

The optical path of the external light incident on the prism 100 may be changed so as to be oriented in the optical-axis direction. Thus, referring to FIG. 2, the external light may sequentially pass through the first lens group 210, the third lens group 230, and the second lens group 220.

Referring to FIG. 2, the prism 100 may have a total reflection surface, which is formed so as to be oriented in an oblique direction relative to the optical-axis direction. The external light incident on the prism 100 may be totally reflected by the total reflection surface, and the optical path thereof may be changed so as to be oriented in the optical-axis direction.

The moving unit 200 may be disposed opposite the prism 100 in the optical-axis direction so that the light emitted from the prism 100 passes through the moving unit 200 in the optical-axis direction. The moving unit 200 may implement the auto-focusing or zoom-up function of the camera module.

In addition, the camera module may include an optical image stabilization (OIS) correction unit 500, which is disposed between the prism 100 and the moving unit 200. OIS is a function that prevents shaking of an optical image. The OIS correction unit 500 may prevent or compensate for shaking of the image captured by the camera module due to a user's hand tremor or other disturbances, thereby improving the quality of the image.

It is preferable that the OIS correction unit 500 be designed so as to have a small volume and to effectively perform the OIS function. Therefore, the OIS correction unit 500 may be implemented as a device including a liquid lens, which is capable of preventing shaking of an image by changing the shape of a liquid provided therein in response to current applied thereto.

The moving unit 200 may include the first lens group 210, the second lens group 220, the third lens group 230, a guide bar 240, and the base 250.

The light emitted from the prism 100 may sequentially pass through the first lens group 210, the third lens group 230, and the second lens group 220. Although not illustrated, an image sensor may be disposed behind the second lens group 220. The light emitted from the second lens group 220 may be incident on the image sensor, and the image sensor may form an image using the incident light.

In an embodiment, the distance between the first lens group 210, the third lens group 230, and the second lens group 220 may be adjusted in order to implement auto-focusing and zoom-up with respect to an image captured by the camera module.

In an embodiment, auto-focusing and zoom-up may be implemented by moving the third lens group 230 in the optical-axis direction to adjust the distance between the first lens group 210 and the third lens group 230 and the distance between the third lens group 230 and the second lens group 220.

Each of the first lens group 210, the third lens group 230, and the second lens group 220 may be configured such that one or two or more lenses are aligned in the optical-axis direction to form an optical system and are mounted in a barrel.

A further description will be made with reference to FIGS. 2 to 4. The first lens group 210 may be disposed adjacent to the prism 100, and the light emitted from the prism 100 may enter the first lens group 210.

The second lens group 220 may be spaced apart from the first lens group 210 in the optical-axis direction, and the third lens group 230 may be disposed between the second lens group 220 and the first lens group 210. The light emitted from the second lens group 220 may enter the image sensor.

In an embodiment, the first lens group 210 and the second lens group 220 may be securely mounted in the camera module so as to be prevented from being moved in the optical-axis direction. At least one of the first lens group 210 or the second lens group 220 or both of the first lens group 210 and the second lens group 220 may be omitted.

However, this is merely exemplary. In another embodiment, the first lens group 210 and the second lens group 220 may be provided so as to be movable in the optical-axis direction. Hereinafter, a structure in which the first lens group 210 and the second lens group 220 are prevented from being moved in the optical-axis direction will be described.

The third lens group 230 may be disposed between the first lens group 210 and the second lens group 220, and may be movable in the optical-axis direction. The distance between the first lens group 210 and the third lens group 230 and the distance between the third lens group 210 and the second lens group 220 may be adjusted by moving the third lens group 230 in the optical-axis direction. Thereby, the camera module is capable of implementing auto-focusing and zoom-up.

The third lens group 230 may include a mover 231, which is provided in a plural number and includes at least one lens. That is, the third lens group 230 may be configured such that a lens or a lens barrel is coupled to the mover 231.

In an embodiment, the third lens group 230 may include, for example, two movers 231. However, the embodiment is not limited thereto, and the third lens group 230 may include one or three or more movers 231. Hereinafter, a configuration in which the third lens group 230 includes two movers 231 will be described.

As illustrated in FIGS. 2 to 4, the movers 231 may include a first mover 231-1, which is disposed adjacent to the first lens group 210, and a second mover 231-2, which is disposed between the first mover 231-1 and the second lens group 220.

Each of the first mover 231-1 and the second mover 231-2 may be provided corresponding to a corresponding one of separate driving magnets 271 and a corresponding one of separate coil parts 272, and may be moved independently in the optical-axis direction.

That is, the operation of each of the first mover 231-1 and the second mover 231-2 may be individually controlled by a corresponding one of the separate driving magnets 271 and a corresponding one of the separate coil parts 272. Accordingly, in response to a control command from the controller, the first mover 231-1 and the second mover 231-2 may be controlled such that the moving distances thereof in the optical-axis direction or the moving directions thereof are different from each other.

Further, each of the first mover 231-1 and the second mover 231-2 may be provided corresponding to a corresponding one of separate sensing magnets 281 and a corresponding one of separate position sensors 282, and thus the moving distance thereof in the optical-axis direction or the moving direction thereof may be independently sensed. Accordingly, the controller may independently control the movement of each of the first mover 231-1 and the second mover 231-2 based on the sensed moving distance and the moving direction of each of the first mover 231-1 and the second mover 231-2.

However, since the concrete structures of the first mover 231-1 and the second mover 231-2 are similar to each other, the first mover 231-1 and the second mover 231-2 will be hereinafter collectively referred to as a mover 231 except where otherwise noted.

The guide bar 240 may be disposed such that the longitudinal direction thereof is oriented in the optical-axis direction, and may serve to guide the movement of the third lens group 230 through sliding contact with the third lens group 230.

The guide bar 240 may be secured to the camera module, and the third lens group 230 may be linearly moved by the mover 231 relative to the guide bar 240 in the optical-axis direction. Therefore, when the mover 231 provided in the third lens group 230 moves in the optical-axis direction, the mover 231 and the guide bar 240 may be brought into sliding contact with each other.

Further, the guide bar 240, which is disposed such that the longitudinal direction thereof is oriented in the optical-axis direction, and which guides the linear movement of the mover 231 and the third lens group 230 in the optical-axis direction, may prevent the third lens group 230 from moving in an unintended direction.

The base 250 may accommodate the first lens group 210 to the third lens group 230 and the guide bar 240. In particular, the guide bar 240 may be securely mounted in the base 250.

In order to secure the guide bar 240 to the base 250, a coupling member 260 may be provided. The coupling member 260 may be coupled to at least one end of the guide bar 240 to fix the position of the guide bar 240.

In the embodiment, four guide bars 240 may be provided, and, referring to FIG. 3, the coupling member 260 may be disposed behind the second lens group 220, and may be coupled to one end of each of the four guide bars 240.

The coupling member 260 may include a recess formed therein to allow the end portion of the guide bar 240 to be inserted thereinto. The end portion of the guide bar 240 may be securely fitted into the recess in an interference fit manner or using an adhesive.

In the embodiment, the recess is formed in a portion protruding from one surface of the coupling member 260. However, in another embodiment, the recess may be concavely formed in one surface of the coupling member 260.

Further, the coupling member 260 is disposed behind the second lens group 220 and is coupled to one end of the guide bar 240. However, in another embodiment, the coupling member 260 may be disposed in front of the first lens group 210, and may be coupled to the opposite end of the guide bar 240. In still another embodiment, coupling members may be disposed behind the second lens group 220 and in front of the first lens group 210, and may be coupled to opposite ends of the guide bar 240.

The coupling member 260 may be coupled to the base 250 in order to stably fix the guide bar 240. A plurality of guide bars 240 may be disposed while maintaining a constant spacing distance therebetween in a plane perpendicular to the optical-axis direction due to engagement with the coupling member 260.

The first printed circuit board 300 may be coupled to the bottom surface of the base 250. The first printed circuit board 300 may be separately provided at each of the base 250 of the first photographing unit and the second photographing unit 600. In another embodiment, the first printed circuit board 300 may be implemented in the form of a unitary body, which is coupled both to the base 250 of the first photographing unit and to the second photographing unit 600.

The first printed circuit board 300 may be electrically connected to the moving coil 272*b* and the position sensor 282 so as to supply the current required in order to drive the camera module. In addition, the first printed circuit board 300 may be provided with a controller, or may be electrically connected to a separately provided controller.

FIG. 5 is a perspective view of FIG. 3, from which some components are removed. FIG. 6 is a front view of FIG. 5. FIG. 7 is a perspective view of FIG. 5, from which some components are removed. FIG. 8 is a front view of FIG. 7.

The guide bar 240 may be provided in a plural number so as to surround the first lens group 210, the second lens group 220, and the third lens group 230. For example, as illustrated in FIGS. 5 and 6, four guide bars 240 may be provided such that two thereof are disposed at an upper portion of a plane perpendicular to the optical-axis direction and the remaining two thereof are disposed at a lower portion of the plane so as to surround the first lens group 210, the second lens group 220, and the third lens group 230.

The four guide bars 240 may be disposed so as to be spaced apart from each other by a predetermined spacing distance in a horizontal direction and a vertical direction in the plane perpendicular to the optical-axis direction. The spacing distance may be appropriately set in consideration of the diameter of the lens or the lens barrel of each lens group.

Further, a driving device for moving the mover 231 in the optical-axis direction may be provided. The driving device may include a driving magnet 271 and a coil part 272.

Since the moving distances in the optical-axis direction or the moving directions of the first mover 231-1 and the second mover 231-2 are independently controlled, the driving magnet 271 and the coil part 272 may be provided at positions corresponding to each of the first mover 231-1 and the second mover 231-2.

Accordingly, as illustrated in FIGS. 5 to 8, two driving magnets 271 for driving the first mover 231-1 and the second mover 231-2 may be spaced apart from each other in a direction perpendicular to the optical-axis direction, and may be disposed at different positions from each other in the optical-axis direction.

Further, similar to the two driving magnets 271, two coil parts 272, which are respectively disposed opposite the two driving magnets 271 to generate electromagnetic interaction therewith, may be spaced apart from each other in a direction perpendicular to the optical-axis direction, and may be disposed at different positions from each other in the optical-axis direction.

As described above, although the two driving magnets 271 and the two coil parts 272 are disposed at different positions, they have similar structures and perform similar functions, and thus will be described collectively hereinafter.

The driving magnet 271 may be coupled to the mover 231. It is preferable for the driving magnet 271 to be disposed further outwards than the mover 231 in a direction perpendicular to the optical-axis direction so as to be located at a position close to the coil part 272.

The driving magnet 271 may be configured as a permanent magnet. Only one driving magnet 271 may be provided. However, in another embodiment, the driving magnet 271 may be configured as a plurality of permanent magnets stacked in a direction perpendicular to the optical-axis direction.

The coil part 272 may be coupled to the base 250, and may be disposed opposite the driving magnet 271. The coil part 272 may include a yoke 272a and a moving coil 272b.

The yoke 272a may be mounted to the base 250, and may be disposed such that the longitudinal direction thereof is oriented in the optical-axis direction. The moving coil 272b may be wound on the yoke 272a, and a part thereof may be disposed opposite the driving magnet 271. Since the longitudinal direction of the moving coil 272b wound on the yoke 272a is oriented in the optical-axis direction, a part of the moving coil 272b in the longitudinal direction has a linear shape.

The coil part 272 may be disposed in a space formed in the base 250. In order to couple the coil part 272 to the base 250, for example, opposite ends of the yoke 272a may be secured to the base 250. In another embodiment, the yoke 272a and the moving coil 272b may be bonded to the base 250 using an adhesive filler.

Opposite ends of the moving coil 272b may be electrically connected to the first printed circuit board 300, and thus the moving coil 272b may receive current from an external power source (not illustrated).

When current is applied to the moving coil 272b, an electromagnetic interaction may occur between the moving coil 272b and the driving magnet 271, and the mover 231, to which the driving magnet 271 is coupled, may move in the optical-axis direction, depending on the direction in which the current is applied, according to Fleming's left-hand rule.

It is possible to adjust the moving direction of the mover 231 in the optical-axis direction, i.e. whether to move the mover 231 toward the first lens group 210 or to move the mover 231 in the opposite direction, i.e. toward the second lens group 220, by adjusting the direction in which the current is applied to the moving coil 272b. Further, it is also possible to adjust the moving distance of the mover 231 in the optical-axis direction by adjusting the time period during which the current is applied to the moving coil 272b.

As described above, the moving direction and the moving distance of the mover 231 may be adjusted through interaction of the moving coil 272b and the driving magnet 271, whereby the camera module is capable of performing the auto-focusing and zoom-up functions.

As described above, in the embodiment, the third lens group 230, which is disposed between the first lens group 210 and the second lens group 220, is composed of two lens groups, and the moving directions and the moving distances of the respective lens groups are independently adjusted by the first mover 231-1 and the second mover 231-2. Thus, the camera module according to the embodiment is capable of efficiently and accurately performing the auto-focusing and zoom-up functions.

Hereinafter, a structure for detecting the moving position of the mover 231 in the optical-axis direction will be described in detail with reference to FIGS. 4 and 11. FIG. 4 is a plan view of FIG. 3.

FIG. 11 is an enlarged view of part A in FIG. 4.

Referring to FIGS. 4 and 11, the device for detecting the moving position of the mover 231 in the optical-axis direction may include a sensing magnet 281, a position sensor 282, and a second printed circuit board 283. The second printed circuit board may be provided separately from the first printed circuit board, or may be integrally formed with the first printed circuit board.

Since the moving distances in the optical-axis direction and the moving directions of the first mover 231-1 and the second mover 231-2 are independently controlled, two pairs of sensing magnets 281 and position sensors 282 may be provided. The two pairs of sensing magnets 281 and position sensors 282 may be disposed separately at different positions from each other.

Therefore, as illustrated in FIG. 4, two sensing magnets 281 for sensing the movement of the first mover 231-1 and the second mover 231-2 may be spaced apart from each other in a direction perpendicular to the optical-axis direction, and may be disposed at different positions from each other in the optical-axis direction.

Further, similar to the two sensing magnets 281, two position sensors 282, which are respectively disposed opposite the two sensing magnets 281, may be spaced apart from each other in a direction perpendicular to the optical-axis direction, and may be disposed at different positions from each other in the optical-axis direction.

Meanwhile, the sensing magnet 281 needs to be spaced apart from the driving magnet 271 in order to avoid magnetic interference with the driving magnet 271.

Accordingly, as illustrated in FIG. 4, the sensing magnet 281 may be spaced apart from the driving magnet 271 in a direction perpendicular to the optical-axis direction, and may be disposed at a position different from that of the driving magnet 271 in the optical-axis direction. That is, the sensing magnet 281 may be disposed so as to be spaced apart from the driving magnet 271 in the optical-axis direction and in a direction perpendicular to the optical-axis direction.

In addition, the position sensor 282 and the second printed circuit board 283, which are disposed opposite the sensing magnet 281, may also be spaced apart from the driving magnet 271 in a direction perpendicular to the optical-axis direction, and may be disposed at positions different from the position of the driving magnet 271 in the optical-axis direction.

Meanwhile, the position sensor 282 may malfunction due to the current applied to the coil part 272, and it is therefore preferable for the position sensor 282 and the coil part 272 to be spaced apart from each other. Accordingly, as illustrated in FIG. 4, the position sensor 282 may be disposed so as to be spaced apart from the coil part 272 in the optical-axis direction and in a direction perpendicular to the optical-axis direction.

As described above, although the two sensing magnets 281, the two position sensors 282, and the two printed circuit boards 283 are disposed at different positions, they have similar structures and perform similar functions, and thus will be described collectively hereinafter.

The sensing magnet 281 may be securely coupled to the mover 231, and thus, when the mover 231 moves, the sensing magnet 281 may move together therewith in the optical-axis direction. The sensing magnet 281 may be configured as a permanent magnet, and may be provided in a singular number. However, the sensing magnet 281 may be formed in a structure in which a plurality of permanent magnets is stacked.

The position sensor 282 may be coupled to the base 250, and may be disposed opposite the sensing magnet 281. The position sensor 282 may be configured to sense a change in the magnetic force of the sensing magnet 281, and may be configured as, for example, a hall sensor.

The second printed circuit board 283 may be coupled to the base 250, and the position sensor 282 may be disposed so as to be coupled to the surface of the second printed circuit board 283 that faces the sensing magnet 281. The second printed circuit board 283 may be electrically connected to the first printed circuit board 300 to apply the current supplied from an external power source to the position sensor 282.

The signal transmitted from the position sensor 282 may be transmitted to a controller, which is provided on the first printed circuit board 300 or is connected to the first printed circuit board 300, through the second printed circuit board 283 and the first printed circuit board 300.

When the sensing magnet 281 moves together with the mover 231, the magnetic field of the sensing magnet 281 changes. The position sensor 282, which is securely disposed at a position opposite the sensing magnet 281, may sense the change in the magnetic field of the sensing magnet 281, thereby detecting information about the movement of the mover 231, such as the moving direction or moving speed of the mover 231.

The information about the movement of the mover 231 detected by the position sensor 282 may be transmitted to the controller, and the controller may perform feedback control of the moving direction, moving speed, and moving position of the mover 231 based on the information about the movement.

The camera module is capable of efficiently and accurately performing auto-focusing and zoom-up functions through the feedback control of the mover 231 by the controller.

FIG. 9 is a perspective view of FIG. 7, from which some components are removed. FIG. 10 is a perspective view illustrating a third lens group 230 according to an embodiment.

A structure including the first mover 231-1 is illustrated by way of example in FIG. 10. Since the first mover 231-1 and the second mover 231-2 have similar structures, the first mover 231-1 and the second mover 231-2 will be hereinafter collectively referred to as a mover 231.

Referring to FIGS. 9 and 10, the mover 231 may include a guide groove 231a in which the guide bar 240 is disposed so as to be in sliding contact therewith. Therefore, the mover 231 may be guided by the guide groove 231a to move in the optical-axis direction while maintaining sliding contact with the guide bar 240.

Referring to FIG. 10, the first mover may include a first magnet groove in which the driving magnet is disposed and a first sensing magnet groove in which the first sensing magnet is disposed. The shortest distance from the optical axis of the lens disposed in the first mover to the first magnet groove may be longer than the shortest distance from the optical axis of the lens disposed in the first mover to the first sensing magnet groove. As illustrated, the first magnet groove may be formed in the outer side of the mover with respect to the center of the lens, and the first sensing magnet groove may be formed further inwards than the first magnet groove with respect to the center of the lens.

The mover 231 may be guided by the guide bar 240 to move linearly in the optical-axis direction, and separate rotational movement of the mover 231 and the guide bar 240 may be prevented.

In the embodiment, since the mover 231 is provided so as to move in the optical-axis direction through sliding contact between the guide bar 240 and the mover 231, a camera module capable of efficiently performing the auto-focusing and zoom-up functions with a simple structure may be realized.

Referring to FIG. 10, a protruding portion 231a-1 may be formed in the guide groove 231a. The protruding portion 231a-1 may be in contact with the guide bar 240, and may serve to reduce the contact area with the guide bar 240.

The protruding portion 231a-1 may protrude in a direction perpendicular to the longitudinal direction of the guide groove 231a. In the embodiment, one protruding portion 231a-1 is formed in one guide groove 231a. However, in another embodiment, two or more protruding portions 231a-1 may be formed in one guide groove 231a.

The protruding portion 231a-1 may reduce the contact area between the guide groove 231a and the guide bar 240 to reduce the contact area between the guide bar 240 and the mover 231.

Since the contact area between the guide bar 240 and the mover 231 is reduced by the protruding portion 231a-1, the frictional resistance that is applied to the mover 231 by the guide bar 240 may be reduced. As a result, the amount of current that is applied to the moving coil 272b to move the mover 231 may be reduced.

In addition, since the contact area between the guide bar 240 and the mover 231 is reduced by the protruding portion 231a-1, wear of the guide bar 240 and the mover 231 may be reduced, thereby accurately implementing the auto-focusing and zoom-up functions of the camera module and increasing the durability of the camera module.

Hereinafter, a structure in which the guide bar 240 is mounted to the base 250 will be described in detail with reference to FIGS. 6 and 12. FIG. 6 is a front view of FIG. 5.

FIG. 12 is a perspective view illustrating a base 250 according to an embodiment.

In order for the guide bar 240 to be mounted to the base 250, a mounting groove 251, in which the guide bar 240 is mounted, may be formed in the base 250. The mounting groove 251 may be formed in the longitudinal direction of the guide bar 240.

The guide bar 240 may be mounted in the mounting groove 251. The guide bar 240 may be securely fitted into the mounting groove 251 using an adhesive or the like.

Referring to FIG. 12, the mounting groove 251 in the base 250, in which the guide bar 240 disposed at an upper portion of the base 250, among the plurality of guide bars 240, is mounted, may be formed in a portion protruding from the side surface of the base 250. This mounting groove 251 may be formed in a plural number in the longitudinal direction of the guide bar 240, i.e. in the optical-axis direction.

In the embodiment, four mounting grooves 251 are formed in the upper portion of the base 250 such that two thereof are disposed in the optical-axis direction and the remaining two thereof are disposed at positions symmetrical thereto. However, the number of mounting grooves 251 formed in the upper portion of the base 250 is not limited thereto.

Further, referring to FIG. 12, the mounting groove 251 in the base 250, in which the guide bar 240 disposed at a lower portion of the base 250, among the plurality of guide bars 240, is mounted, may be formed in a portion protruding from the bottom surface of the base 250. This mounting groove 251 may be formed such that the longitudinal direction thereof is oriented in the longitudinal direction of the guide bar 240.

In the embodiment, two mounting grooves 251 are formed in the lower portion of the base 250 such that one thereof is continuously formed in the optical-axis direction and the remaining one thereof is disposed at a position symmetrical thereto. However, in another embodiment, the lower mounting groove 251 may be composed of a plurality of sections, which are discontinuously disposed in a row in the longitudinal direction of the guide bar 240, rather than being formed in a single continuous shape.

Although only a limited number of embodiments have been described above, various other embodiments are possible. The technical contents of the above-described embodiments may be combined into various forms as long as they are not incompatible with one another, and thus may be implemented in new embodiments.

MODE FOR INVENTION

Various embodiments have been described in the best mode for carrying out the disclosure.

INDUSTRIAL APPLICABILITY

A camera module according to embodiments may be used in mobile devices such as mobile phones, smartphones, tablet PCs, and laptops.

The invention claimed is:

1. A camera module, comprising:
a base;
four guide bars coupled to the base, each of the guide bars being configured to be stationary;
a first mover disposed in the base, the first mover comprising at least one lens disposed therein; and
a second mover disposed in the base, the second mover comprising at least one lens disposed therein,
wherein each of the first mover and the second mover comprises four guide grooves formed therein to allow respective guide bars to be disposed therein, each of the guide grooves being arranged symmetrically with respect to another of the guide grooves that is located on a respective opposite side of the first or second mover in a direction orthogonal to an optical axis,
wherein each of the guide grooves comprises a protruding portion formed in each of the guide grooves to be in contact with a respective one of the guide bars,
wherein a plurality of mounting grooves, in each of which a respective one of the guide bars is mounted, are formed in the base in a longitudinal direction of the guide bars, and wherein the first mover and the second mover are guided by the guide grooves to move in an optical-axis direction while maintaining sliding contact with the guide bars, and wherein each protruding portion is protruded outward in a direction perpendicular to the optical-axis direction from a bottom surface of each of the guide grooves to reduce a contact area between the respective guide groove and the respective guide bar to reduce a contact area between the guide bars and each of the first mover and the second mover.

2. The camera module according to claim 1, further comprising:
a prism configured to change an optical path of external light incident thereon such that the optical path is oriented in a direction perpendicular to a direction in which the lens disposed in the first mover and the lens disposed in the second mover are aligned.

3. The camera module according to claim 1, wherein the guide bars are disposed so as to surround the first mover and the second mover.

4. The camera module according to claim 1, further comprising:
a coupling member coupled to at least one end of each of the guide bars to fix positions of the guide bars.

5. The camera module according to claim 1, further comprising:
a first driving magnet disposed at one side of the first mover;
a first coil part coupled to the base and disposed opposite the first driving magnet;
a sensing magnet disposed at an opposite side of the first mover; and
a first position sensor coupled to the base and disposed opposite the sensing magnet.

6. The camera module according to claim 5, wherein the sensing magnet is spaced apart from the first driving magnet in the direction perpendicular to the optical-axis direction.

7. The camera module according to claim 2, further comprising:
a lens disposed between the prism and the first mover or between the prism and the second mover.

8. The camera module according to claim 2, further comprising:
a lens disposed between the first mover and the second mover.

9. The camera module according to claim 1, wherein each of the guide grooves comprises a single protruding portion.

10. A camera module, comprising:
a prism configured to change an optical path; and
a moving unit disposed opposite the prism,
wherein the moving unit comprises:
a first lens group disposed adjacent to the prism;
a second lens group disposed so as to be spaced apart from the first lens group in an optical-axis direction;
a third lens group disposed between the first lens group and the second lens group and configured to move in the optical-axis direction;
four guide bars disposed such that a longitudinal direction of respective guide bars is oriented in the optical-axis direction and configured to be in sliding contact with the third lens group to guide movement of the third lens group, each of the guide bars being configured to be stationary; and
a base to which the guide bars are mounted,
wherein the third lens group comprises a mover, the mover comprising a plurality of guide grooves, each of the guide bars being disposed so as to be in sliding contact with a respective guide groove of the plurality of guide grooves, wherein each of the plurality of guide grooves comprises a protruding portion formed in each of the guide grooves to be in contact with a respective one of the guide bars, wherein a plurality of mounting grooves in which a respective guide bar of the guide bars is mounted, is formed in the base in a longitudinal direction of the guide bars, and wherein the mover is guided by the plurality of guide grooves to move in an optical-axis direction while maintaining sliding contact with the guide bars, and wherein the protruding portion is protruded outward in a direction perpendicular to the optical-axis direction from a bottom surface of each of the plurality of guide grooves to reduce a contact area between the guide grooves and the guide bars to reduce a contact area between the guide bars and the mover.

11. The camera module according to claim 10, wherein the mover is provided in a plural number and includes at least one lens.

12. The camera module according to claim 11, wherein the mover comprises:

a first mover disposed adjacent to the first lens group; and a second mover disposed between the first mover and the second lens group.

13. The camera module according to claim 10, wherein the guide bars are disposed so as to surround the first lens group, the second lens group, and the third lens group.

14. The camera module according to claim 10, further comprising a coupling member coupled to at least one end of each of the guide bars to fix positions of the guide bars.

15. The camera module according to claim 11, further comprising:

a driving magnet coupled to the mover; and a coil part coupled to the base and disposed opposite the driving magnet.

16. The camera module according to claim 15, wherein the coil part comprises:

a yoke mounted to the base and disposed such that a longitudinal direction thereof is oriented in the optical-axis direction; and a moving coil wound on the yoke such that a part thereof is disposed opposite the driving magnet.

17. The camera module according to claim 15, further comprising:

a sensing magnet coupled to the mover;

a position sensor coupled to the base and disposed opposite the sensing magnet; and a second printed circuit board coupled to the base and configured to allow the position sensor to be mounted thereon.

18. The camera module according to claim 17, wherein the sensing magnet is spaced apart from the driving magnet in the optical-axis direction and in the direction perpendicular to the optical-axis direction, and wherein the position sensor is spaced apart from the coil part in the optical-axis direction and in the direction perpendicular to the optical-axis direction.

19. The camera module according to claim 10, wherein each of the plurality of guide grooves comprises a single protruding portion.

20. The camera module according to claim 10 wherein each guide groove includes a first wall, a second wall and a third wall connecting the first wall and the second wall, the third wall defining a bottom portion of the guide groove, and wherein the first wall and the second wall are planar and the third wall is curved.

\* \* \* \* \*